United States Patent
Min et al.

(10) Patent No.: US 9,564,803 B1
(45) Date of Patent: Feb. 7, 2017

(54) CONTROL CIRCUIT AND SWITCHING POWER SUPPLY UNIT

(71) Applicant: TDK Corporation, Tokyo (JP)

(72) Inventors: Lin Min, Tokyo (JP); Ken Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/061,410

(22) Filed: Mar. 4, 2016

(30) Foreign Application Priority Data

Aug. 28, 2015 (JP) ................................. 2015-169597

(51) Int. Cl.
*H02M 3/156* (2006.01)

(52) U.S. Cl.
CPC ................... *H02M 3/156* (2013.01)

(58) Field of Classification Search
CPC .............. H02M 3/156; H02M 3/158; H02M 2003/1566; H02M 3/155; H02M 3/157; H02M 2001/0012; H02M 3/1563; H02M 2001/009
USPC .......................... 323/282, 283, 284, 285, 351
See application file for complete search history.

(56) References Cited

U.S. PATENT DOCUMENTS

| | | | | |
|---|---|---|---|---|
| 6,064,187 A * | 5/2000 | Redl | ........................ | G05F 1/565 323/224 |
| 6,147,478 A | 11/2000 | Skelton et al. | | |
| 6,163,142 A * | 12/2000 | Tsujimoto | ........... | H02M 3/1582 323/283 |
| 7,202,642 B1 | 4/2007 | Chen et al. | | |
| 2005/0146908 A1* | 7/2005 | Feldtkeller | .......... | H02M 1/4225 363/125 |
| 2006/0043955 A1* | 3/2006 | Hung | .................... | H02M 3/158 323/283 |
| 2006/0152204 A1* | 7/2006 | Maksimovic | ........... | H02M 1/38 323/284 |
| 2007/0018619 A1* | 1/2007 | Endo | ................... | H02M 3/1588 323/224 |
| 2007/0069703 A1* | 3/2007 | Kokubun | ............ | H02M 3/1588 323/282 |
| 2010/0090673 A1* | 4/2010 | Nakagawa | .......... | H02M 3/1584 323/284 |
| 2012/0212204 A1* | 8/2012 | Philbrick | .............. | H02M 3/156 323/284 |
| 2013/0010502 A1* | 1/2013 | Chen | ................... | H02M 3/3387 363/21.02 |
| 2013/0278059 A1* | 10/2013 | Liu | ........................ | G05F 1/577 307/31 |
| 2014/0266123 A1* | 9/2014 | Rader | ................... | H02M 3/156 323/288 |

(Continued)

FOREIGN PATENT DOCUMENTS

JP 2007-181389 A 7/2007

*Primary Examiner* — Adolf Berhane
(74) *Attorney, Agent, or Firm* — Oliff PLC (57) ABSTRACT

A control circuit controls a switching element in a switching power supply unit. The control circuit includes: a controller connected to the switching element; a signal generating circuit connected to the input part of the controller; a reference voltage source connected to the signal generating circuit; and a comparator having a first input terminal to which an output voltage is input from the switching power supply unit, a second input terminal to which a comparison signal is input from the signal generating circuit, and an output terminal connected to the signal generating circuit and to the input part of the controller.

20 Claims, 10 Drawing Sheets

(56) References Cited

U.S. PATENT DOCUMENTS

| | | | | |
|---|---|---|---|---|
| 2014/0340066 A1* | 11/2014 | Chen | ............... | H02M 3/156 323/284 |
| 2015/0042300 A1* | 2/2015 | Peker | ............... | H02M 3/156 323/274 |
| 2016/0111236 A1* | 4/2016 | Jin | ............... | G05F 1/569 323/276 |
| 2016/0204704 A1* | 7/2016 | Cao | ............... | H02M 3/156 323/271 |

* cited by examiner

CONTROL CIRCUIT AND SWITCHING POWER SUPPLY UNIT

BACKGROUND OF THE INVENTION

1. Field of the Invention

The present invention relates to a control circuit and a switching power supply unit.

2. Description of the Related Art

Ripple injection non-linear control in which a comparator is used is known as a method of controlling a switching power supply unit (see U.S. Pat. Nos. 6,147,478 and 7,202,642).

Figure 9:
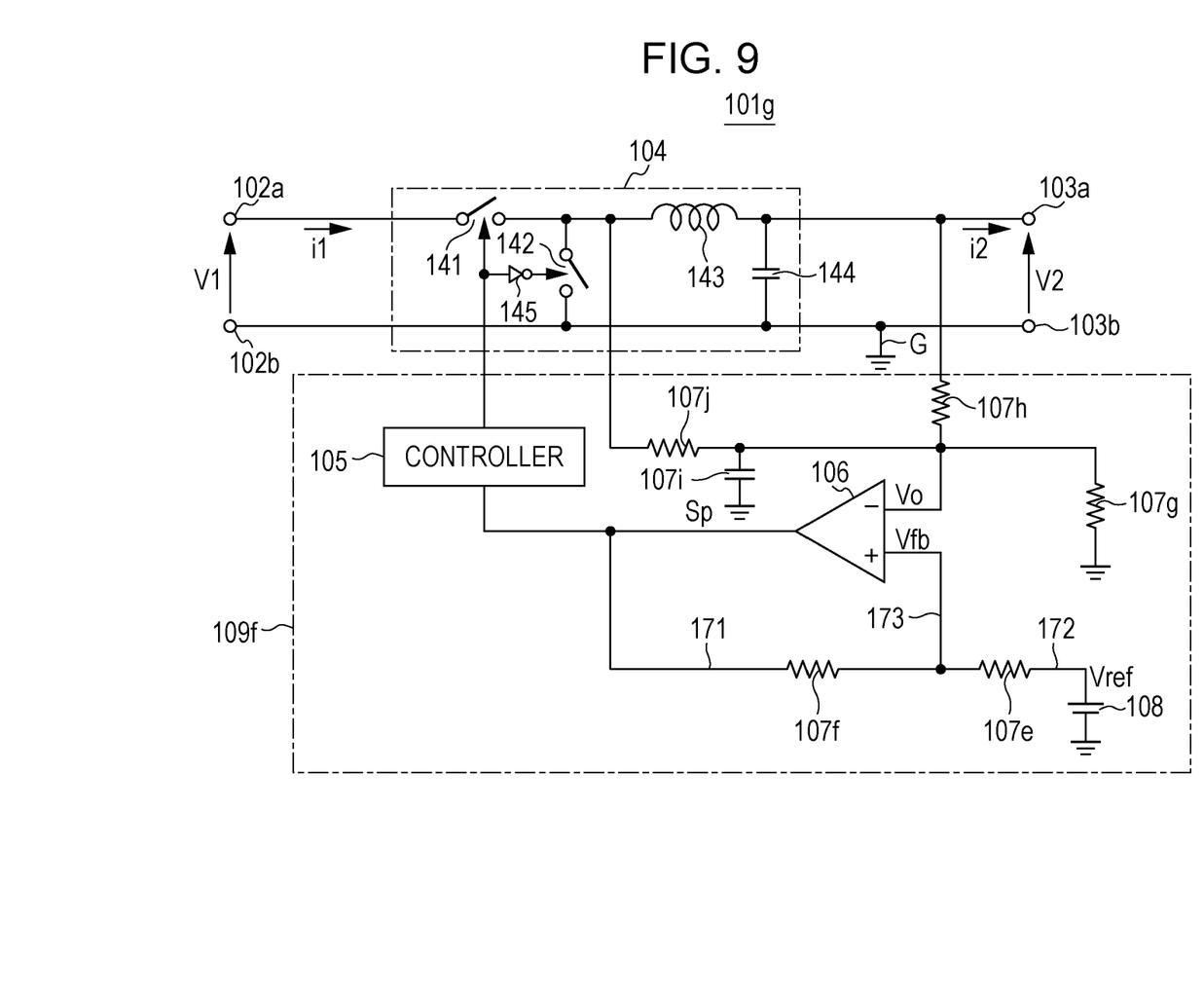
FIG. 9 illustrates the circuit structure of a conventional switching power supply unit.

In the circuit illustrated in FIG. 9 that is used in ripple injection hysteresis control described in U.S. Pat. No. 6,147,478, a comparison voltage Vfb input to the non-inverted input terminal of a comparator 106 becomes a first voltage, which is at a high level, when an output Sp from the comparator 106 is high and becomes a second voltage, which is at a low level, when the output Sp from the comparator 106 is low. A difference between the first voltage and the second voltage is a hysteresis width. An alternating-current component obtained by integrating the output voltage from the comparator 106 or a voltage in phase with the output voltage is superimposed on a direct-current voltage obtained by dividing an output voltage V2 by using a resistor, after which the resulting voltage is input to the inverted input terminal of the comparator 106. If the input voltage is lower than a comparison voltage for the second voltage, the output Sp from the comparator 106 goes high and a driving period starts, in which case the comparison voltage becomes the first voltage. The alternating-current voltage, which has been input to the inverted input terminal of the comparator 106, is raised during the driving period, and is superimposed on the direct-current voltage obtained by dividing the output voltage by using a resistor. If the resulting voltage is higher than a comparison voltage for the first voltage, the output Sp from the comparator 106 goes low and the driving period is terminated, entering a stop period. At that time, the comparison voltage becomes the second voltage. In the stop period, the alternating-current voltage, which has been input to the inverted input terminal of the comparator 106, is lowered.

Figure 10:
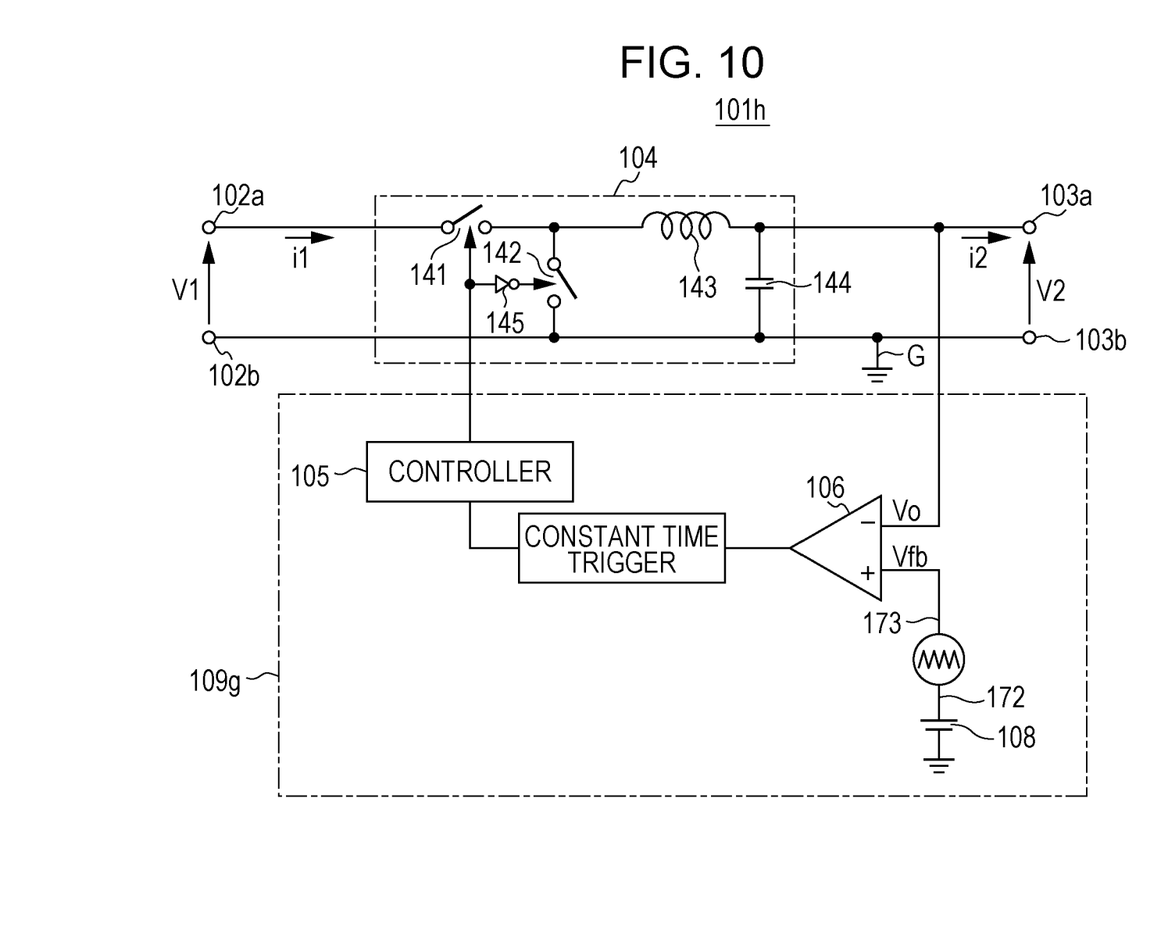
FIG. 10 illustrates the circuit structure of another conventional switching power supply unit.

In ripple injection non-linear control in which a comparator is used, a control method is also known in which a ripple is input to the non-inverted input terminal of a comparator, besides a control method in which a ripple is input to the inverted input terminal of a comparator. In the circuit illustrated in FIG. 10 that is used in non-linear control described in U.S. Pat. No. 7,202,642, for example, a triangle-wave alternating-current voltage is superimposed on a comparison voltage and the resulting voltage is input to the non-inverted input terminal of the comparator 106. The voltage input to the non-inverted input terminal is compared with the direct-current voltage of an output voltage, which has been input to the inverted input terminal. If the voltage at the non-inverted input terminal becomes higher than a voltage fed back from the output voltage, the output from the comparator 106 goes high and goes low soon. There is non-linear control in which a fixed on-time is provided; in a non-linear control of this type, the driving period is stopped when a certain period elapses after a high-level trigger signal for the output Sp is received from the comparator 106. Conversely, there is non-linear control in which a fixed off-time is provided.

As a non-linear control method in which a comparator is used, Japanese Unexamined Patent Application Publication No. 2007-181389 discloses a technology about burst control in which switching is performed a plurality of times during a period in which a comparator is at the high level. The technology in Japanese Unexamined Patent Application Publication No. 2007-181389 includes a hysteresis comparator that compares an output voltage with a comparison voltage and a circuit that turns off a gate voltage for a certain period when a current in a switching element reaches a certain value. The gate voltage is tuned on during a period in which the hysteresis comparator is at the high level, after which, when the current reaches the certain value, the gate voltage is tuned off and a period during which the hysteresis comparator is at the high level is continued. Therefore, the gate voltage is turned on again, after which, when the current reaches the certain value again, the gate voltage is turned off. Since these operations are repeated, switching is performed a plurality of times during a period in which the hysteresis comparator is at the high level. During a period in which the hysteresis comparator is at the low level, the gate voltage is not turned off, so switching is stopped.

During the period in which the hysteresis comparator is at the high level, switching is repeated, so a current larger than a load current is supplied from a switching power supply unit to an output capacitor, raising the output voltage. During the period in which the hysteresis comparator is at the low level, switching is stopped, so the load current is supplied from the output capacitor without a current being supplied from the switching power supply unit, lowering the output voltage.

SUMMARY OF THE INVENTION

However, the conventional technology is problematic in that, since an output voltage feedback circuit loop in U.S. Pat. No. 6,147,478 has low-pass characteristics due to resistors 107$h$ and 107$g$ and a capacitor 107$i$, a response to a rapid change in an output load is slow. To improve the responsiveness, the hysteresis width of Vfb needs to be reduced. This may lead to the possibility that switching noise causes a malfunction. It is also difficult to assure a phase margin, which is an important index related to stability control. Another problem is that there is a dependency on an output voltage ripple of the converter.

A problem in U.S. Pat. No. 7,202,642 is that, although malfunctions caused by switching noise generated when the power switch is turned on can be reduced, malfunctions caused by switching noise generated when the power switch is turned off are still problematic. Another problem is that, since a fixed-time trigger, which is turned on during a fixed time, is used and a response cannot be returned in the fixed time, so a response to a rapid change in an output load is slow.

The present invention addresses the above problems with the object of providing a control circuit and a switching power supply unit that can maintain superior responsiveness even for high-frequency driving, can be highly resistant to switching noise, and can assure a sufficient phase margin without depending on the output voltage ripple of the converter.

The control circuit according to the present invention is a control circuit that controls a switching element in a switching power supply unit. The control circuit includes a controller connected to the switching element, a signal generating circuit connected to an input part provided for the controller, a reference voltage source connected to the signal generating circuit, and a comparator having a first input terminal to which an output voltage is input from the switching power supply unit, a second input terminal to which a comparison signal is input from the signal generating circuit, and an output terminal connected to the signal generating circuit and to the input part provided for the controller. The comparison signal is created according to an output signal from the comparator and to a reference voltage of the reference voltage source. The comparison signal is raised when the output signal from the comparator is switched from a second level to a first level, the comparison signal is lowered with a first inclination during a period in which the output signal from the comparator is at the first level. The comparison signal is further lowered when the output signal from the comparator is switched from the first level to the second level. The comparison signal is raised with a second inclination during a period in which the output signal from the comparator is at the second level.

Thus, the control circuit can maintain superior responsiveness, can be highly resistant to switching noise, and can assure a sufficient phase margin without depending on the output voltage ripple of the converter.

Preferably, with the switching power supply unit according to the present invention, the time average value of the comparison signal may be equal to the reference voltage. Thus, the control circuit accurately operates, so the switching power supply unit can maintain superior responsiveness, can be highly resistant to switching noise, and can assure a sufficient phase margin without depending on the output voltage ripple of the converter.

The reference voltage source may include an integrating circuit that integrates a difference between a comparison voltage and the output voltage from the switching power supply unit. Thus, a steady-state deviation between the comparison voltage and the output voltage can be improved.

The output voltage from the switching power supply unit may be input to the first input terminal of the comparator through a constant-voltage source. Thus, response characteristics in a rapid load change can be improved.

The signal generating circuit may include a proportional element, an integrating element, a subtracter, a first capacitive element, and a first resistor. Thus, the signal generating circuit can be implemented with a simple circuit structure.

An input part provided for the proportional element may be connected to the output terminal of the comparator. An input part provided for the integrating element may be connected to the output terminal of the comparator. An output part provided for the proportional element may be connected to a first input part provided for the subtracter. An output part provided for the integrating element may be connected to a second input part provided for the subtracter. An output part provided for the subtracter may be connected to one end of the first capacitive element. The other end of the first capacitive element may be connected to one end of the first resistor and to the second input terminal of the comparator. The other end of the first resistor may be connected to one end of the reference voltage source. The other end of the reference voltage source may be connected to common ground. Thus, the control circuit including the signal generating circuit can be implemented with a simple circuit structure.

The proportional element may have a second resistor and a third resistor. The second resistor may be disposed between an output part provided for the comparator and the first input part provided for the subtracter. The third resistor may be disposed between the common ground and the first input part provided for the subtracter. Thus, the proportional element can be implemented with a simple circuit structure.

The integrating element may have a fourth resistor and a second capacitive element. The fourth resistor may be disposed between the output part provided for the comparator and the second input part provided for the subtracter. The second capacitive element may be disposed between the common ground and the second input part provided for the subtracter. Thus, the integrating element can be implemented with a simple circuit structure.

The subtracter may include an operational amplifier, a capacitor, and a fifth resistor. Thus, the subtracter can be implemented with a simple circuit structure.

The controller may switch the switching element a plurality of times during a period in which the output signal from the comparator is at the first level and may stop the switching of the switching element during a period in which the output signal from the comparator is at the second level. Thus, the on/off cycle of the switching element becomes sufficiently shorter than a burst cycle, which is the on/off cycle of the output from the comparator. Therefore, when the voltage at the output terminal of the comparator becomes at the first level, the output voltage is raised immediately; when the voltage at the output terminal of the comparator becomes at the second level, the output voltage is lowered immediately. This enables a control method such as a so-called burst control method to be used.

The switching power supply unit may be a resonant converter. Thus, the switching frequency can be increased without an increase in loss. This can lessen energy stored in an inductor and a capacitor used in the resonant converter. Therefore, the switching power supply unit does not depend on the output voltage ripple of a high-frequency converter, and can thereby be applied to a burst control method as well.

The control circuit according to the present invention is a control circuit that controls a switching element in a switching power supply unit. The control circuit includes a controller connected to the switching element and also includes a comparator having a first input terminal to which an output voltage is input from the switching power supply unit, a second input terminal to which a comparison signal is input from a signal generating circuit, and an output terminal connected to an input part provided for the controller. The signal generating circuit has a first input terminal to which a signal is input according to an output signal output from the output terminal of the comparator and also has a second input terminal to which a reference voltage is input from a reference voltage source. The comparison signal is created according to a signal based on the output signal output from the output terminal of the comparator and to the reference voltage of the reference voltage source. The comparison signal is raised when the signal based on the output signal output from the output terminal of the comparator is switched from a second level to a first level; the comparison signal is lowered with a first inclination during a period in which the signal based on the output signal output from the output terminal of the comparator is at the first level; the comparison signal is further lowered when the signal based on the output signal output from the output terminal of the comparator is switched from the first level to the second level; the comparison signal is raised with a second inclination during a period in which the signal based on the output signal output from the output terminal of the comparator is at the second level.

Thus, the control circuit can maintain superior responsiveness, can be highly resistant to switching noise, and can assure a sufficient phase margin without depending on the output voltage ripple of the converter.

The present invention can provide a control circuit and a switching power supply unit that can maintain superior responsiveness even for high-frequency driving, can be highly resistant to switching noise, and can assure a sufficient phase margin without depending on the output voltage ripple of the converter.

DESCRIPTION OF THE PREFERRED EMBODIMENTS

Preferred embodiments of the present invention will be described below. The present invention is not limited to the embodiments described below. Constituent elements described below include constituent elements that a person having ordinary skill in the art can easily assume and constituent elements that are essentially the same as constituent elements that a person having ordinary skill in the art can easily assume. The constituent elements described below can be appropriately combined.

Embodiments of the present invention will be described below in detail with reference to the drawings. In the explanation of the drawings, like elements will be denoted by like reference characters, and repeated descriptions will be omitted.

Figure 1:
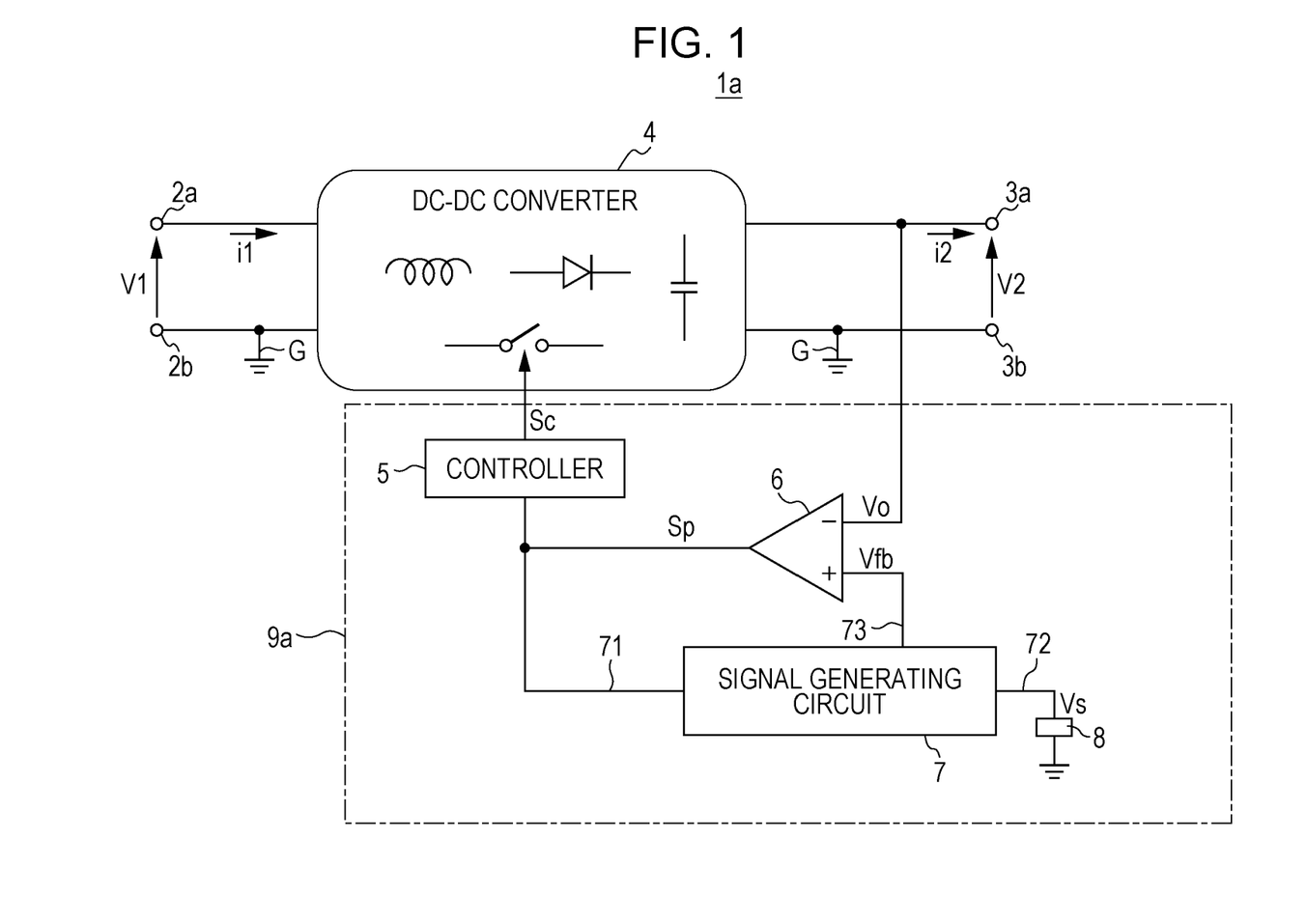
FIG. 1 schematically illustrates the circuit structure of a switching power supply unit according to a first embodiment of the present invention.

First, the entire structure of a switching power supply unit 1 according to a preferred embodiment of the present invention will be described with reference to FIG. 1. FIG. 1 schematically illustrates the circuit structure of a switching power supply unit according to a preferred embodiment of the present invention. The switching power supply unit 1a illustrated in FIG. 1 has a main circuit 4 and a control circuit 9a.

The switching power supply unit 1a also has a pair of input terminals 2a and 2b (sometimes referred to below as the input terminals 2 when they do not need to be distinguished) and a pair of output terminals 3a and 3b (sometimes referred to below as the output terminals 3 when they do not need to be distinguished).

Specifically, an input voltage (direct-current voltage) V1 is applied between the pair of input terminals 2a and 2b; the input terminal 2b connected to a reference potential (common ground G in this example) is on a low-potential side. An output voltage V2 (sum of a direct-current component voltage and an output voltage ripple) is output between the pair of output terminals 3a and 3b; the output terminal 3b connected to the reference potential (common ground G in this example) is on a low-potential side.

The main circuit 4 is a voltage converting circuit; it has, for example, an input capacitor, a switching unit including a switching element controlled by a controller 5, a rectifying unit including a diode and a field-effect transistor (FET), a smoothing unit including a choke coil and a capacitor, and other units. The main circuit 4 accepts the input voltage V1 from the input terminals 2, converts it to the output voltage V2, and outputs it to the output terminals 3.

The control circuit 9a has the controller 5, a comparator 6, a signal generating circuit 7, and a reference voltage source 8; the control circuit 9a controls the operation of the switching element in the main circuit 4. The comparator 6 has a first input terminal and a second input terminal. The first input terminal of the comparator 6 is connected to the output terminal 3a and the second input terminal is connected to an output terminal 73 provided for the signal generating circuit 7. The comparator 6 outputs, from its output terminal, an output signal Sp, which is an output voltage from the comparator 6. The output terminal is connected to an input part provided for the controller 5 and to a first input terminal 71 provided for the signal generating circuit 7. The reference voltage source 8 sends a reference voltage Vs to the second input terminal 72 of the signal generating circuit 7.

As an example of control by the control circuit 9a, it controls the switching element so that when an output Sc from the controller 5 is at an H level (first level), the output voltage V2 is raised, and that when the output Sc from the controller 5 is at an L level (second level), the output voltage V2 is lowered. The operation of the control circuit 9a will be described below in detail with reference to FIGS. 1 and 4.

An output voltage Vo, which is a substantially direct-current output voltage, is input to the first input terminal of the comparator 6; the alternating-current ripple component of the output voltage Vo is sufficiently small enough to be negligible. In contrast, a comparison signal Vfb output from the output terminal 73 of the signal generating circuit 7 is input to the second input terminal of the comparator 6. The comparison signal Vfb is created according to the output signal Sp from the comparator 6 and to the voltage level of the reference voltage Vs.

Figure 4:
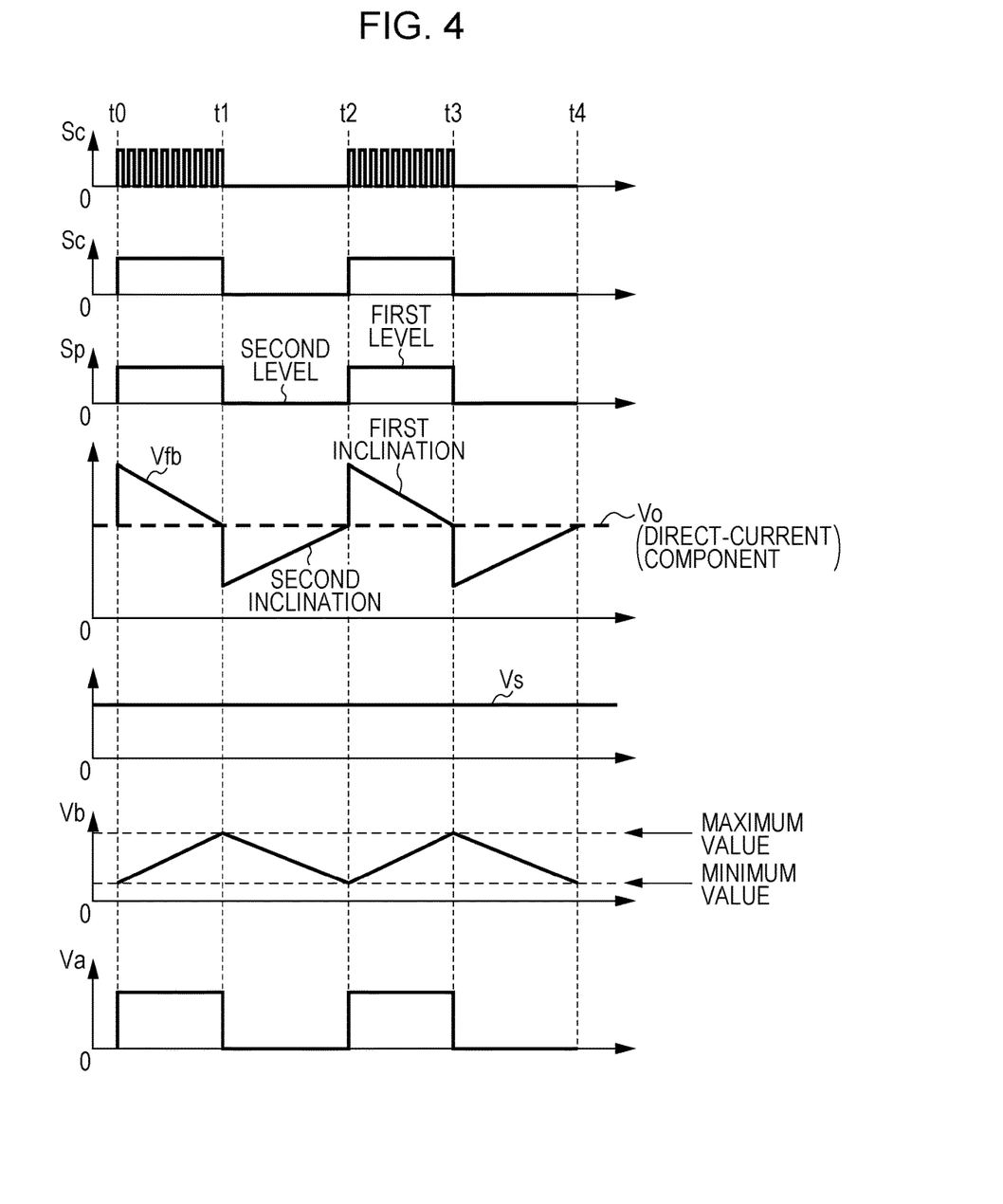
FIG. 4 illustrates steady-state operating waveform charts used to explain the operations of the switching power supply units according to the first, second, and third embodiments of the present invention.

The steady-state operations of the output signal Sp from the comparator 6, the reference voltage Vs, the output voltage Vo, and the comparison signal Vfb from the output terminal 73 of the signal generating circuit 7 are as illustrated in FIG. 4; the comparison signal Vfb from the output terminal 73 of the signal generating circuit 7 is raised when the output signal from the comparator 6 is switched from the second level (L level) to the first level (H level); the comparison signal Vfb is lowered with a first inclination during a period in which the output terminal voltage is at the first level; the comparison signal Vfb is further lowered when the output terminal voltage is switched from the first level to the second level; the comparison signal Vfb is raised with a second inclination during a period in which the output terminal voltage is at the second level. These operations are repeated. The steady-state operating waveforms in FIG. 4 will be described separately in detail. The average value of the comparison signal Vfb from the output terminal 73 of the signal generating circuit 7 is equal to the reference voltage Vs, which is the voltage value of the reference voltage source 8. Of course, the first level and second level of the output signal from the comparator 6 differ from each other.

Figure 2:
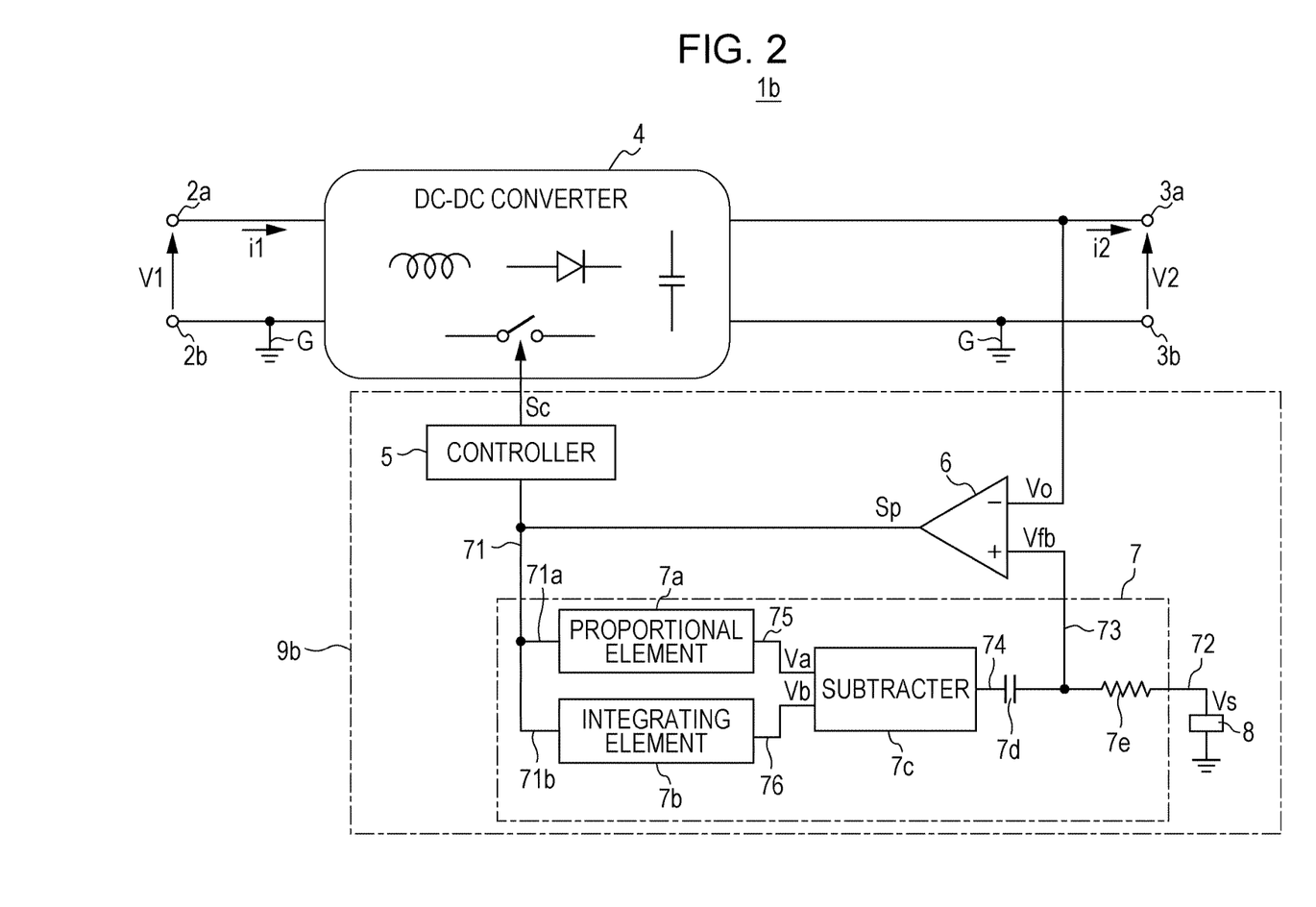
FIG. 2 schematically illustrates the circuit structure of a switching power supply unit according to a second embodiment of the present invention.

Next, an embodiment of the control circuit 9a illustrated in FIG. 1 will be described with reference to FIG. 2. FIG. 2 differs from FIG. 1 in that the signal generating circuit 7 in FIG. 1 is indicated by specific circuit elements including a proportional element 7a, an integrating element 7b, and a subtracter 7c; in other respects, the structure is the same as in FIG. 1.

Specifically, the control circuit 9b includes the controller 5, the comparator 6, the proportional element 7a, the integrating element 7b, the subtracter 7c, a first capacitor 7d, which is an embodiment of a first capacitive element, a first resistor 7e, and the reference voltage source 8. An input terminal 71a, which is an input part provided for the proportional element 7a, an input terminal 71b, which is an input part provided for the integrating element 7b, are connected to the output terminal of the comparator 6. An output terminal 75, which is an output part provided for the proportional element 7a, is connected to a first input terminal, which is a first input part provided for the subtracter 7c. An output terminal 76, which is an output part provided for the integrating element 7b, is connected to a second input terminal, which is a second input part provided for the subtracter 7c. An output terminal 74, which is an output part provided for the subtracter 7c, is connected to one end of the first capacitor 7d. The other end 73 of the first capacitor 7d is connected to the second input terminal of the comparator 6 and to one end of a first resistor 7e. The other end 72 of the first resistor 7e is connected to one end of the reference voltage source 8. The other end of the reference voltage source 8 is at the common ground potential G.

The proportional element 7a, integrating element 7b, and subtracter 7c can be structured by using an operational amplifier, a resistor, a capacitor, and the like. It is also possible to structure the proportional element 7a, integrating element 7b, and subtracter 7c with a certain gain to improve control characteristics and the linearity of integration action.

It is also possible to structure the proportional element 7a, integrating element 7b, and subtracter 7c by using digital elements, instead of using an operational amplifier, a resistor, and a capacitor.

Figure 3:
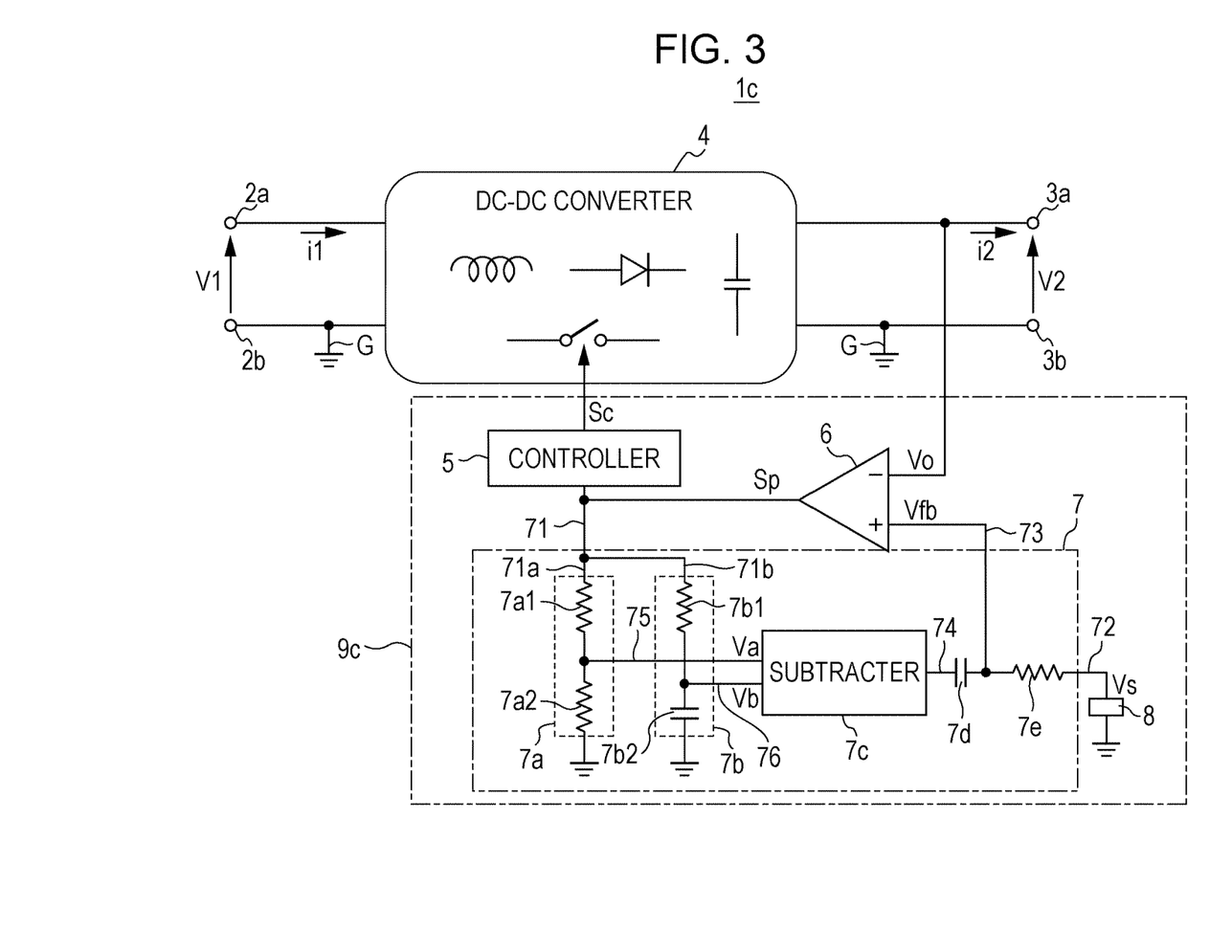
FIG. 3 schematically illustrates the circuit structure of a switching power supply unit according to a third embodiment of the present invention.

Next, an embodiment of the control circuit 9b illustrated in FIG. 2 will be described with reference to FIG. 3. FIG. 3 differs from FIG. 2 in that the proportional element 7a in FIG. 2 is structured by using a second resistor 7a1 and a third resistor 7a2 and that the integrating element 7b in FIG. 2 is represented by a specific circuit structure including a fourth resistor 7b1 and a second capacitor 7b2, which is an embodiment of a second capacitive element; in other respects, the structure is the same as in FIG. 2. Thus, the proportional element 7a and integrating element 7b can be structured by using a simple circuit structure.

The input terminal 71a of the second resistor 7a1 is connected to the output terminal of the comparator 6. The other end of the second resistor 7a1 is connected to the first input terminal of the subtracter 7c and to one end of the third resistor 7a2. The other end of the third resistor 7a2 is at the common ground potential. The proportional element 7a is structured in this way. If the resistance of the second resistor 7a1 is denoted R1 and the resistance of the third resistor 7a2 is denoted R2, the ratio n of the proportional element 7a is defined to be R2/(R1+R2).

The input terminal 71b of the fourth resistor 7b1 is connected to the output terminal of the comparator 6. The other end of the fourth resistor 7b1 is connected to the second input terminal of the subtracter 7c and to one end of the second capacitor 7b2. The other end of the second capacitor 7b2 is at the common ground potential. If the resistance of the fourth resistor 7b1 is denoted R3 and the capacitance of the second capacitor 7b2 is denoted C2, the time constant T of the integrating element 7b is defined to be R3C2.

In the structure described above, a portion from the first input terminal of the comparator 6 to the output terminal of the comparator 6 has differential characteristics, contributing to quick responsiveness and stability in a control loop.

Next, operating waveforms at various timings will be described with reference to the steady-state operating waveforms in FIG. 4. The output voltage Vo input to the first input terminal of the comparator 6 is a substantially direct-current output voltage; the alternating-current ripple component of the output voltage Vo is sufficiently small enough to be negligible. The comparison signal Vfb input to the second input terminal of the comparator 6 is a voltage created according to the output signal Sp from the comparator 6 and to the voltage level of the reference voltage Vs. In contrast, a voltage Va between the proportional element 7a and subtracter 7c is a voltage created by dividing the output signal Sp from the comparator 6 by using the second resistor 7a1 and third resistor 7a2 included in the proportional element 7a. Similarly, a voltage Vb between the integrating element 7b and subtracter 7c is a voltage created by integrating the output signal Sp from the comparator 6 by using the fourth resistor 7b1 and second capacitor 7b2 included in the integrating element 7b. The subtracter 7c transmits a differential voltage between the voltage Va from the proportional element 7a and the voltage Vb from the integrating element 7b, from the output terminal 74 to the first capacitor 7d, the output terminal 74 being the output part of the subtracter 7c.

First, an operation from t0 to t1 will be described as one of operations indicated by operating waveforms at various timings. When t is t0, the voltage Va is raised to a ratio voltage level set with the proportional element 7a and the voltage Vb is at the minimum value of the steady-state operating voltage. The comparison signal Vfb at t0 is raised to a level higher than the output voltage Vo, after which the comparison signal Vfb is linearly lowered with the first inclination during a period from t0 to t1. The voltage level of the output signal Sp from the comparator 6 during this period is approximately the voltage level of the operation power supply unit for the comparator 6, so the output signal Sp is output at the first level (H level). The output from the controller 5 in this period is a driving signal that turns on a switching element in the switching power supply unit 1, the driving signal being output as the control signal Sc from the controller 5 according to the output signal Sp from the comparator 6. Alternatively, the output from the controller 5 in this period is a driving signal that turns on and off a switching element in the main circuit 4 a plurality of times, the driving signal being output as the control signal Sc from the controller 5 according to the output signal Sp from the comparator 6.

Next, an operation from t1 to t2 in FIG. 4 will be described. When the Vfb is linearly lowered with the first inclination from t0 to t1 and reaches the output voltage Vo at t1, the voltage level of the output signal Sp is switched approximately to the level of the common ground G and becomes the second level (L level). The voltage Va at t1 is lowered to the level of the common ground G. In contrast, the voltage Vb becomes the maximum value of the steady-state operating voltage. The comparison signal Vfb at t1 is lowered to a level lower than the output voltage Vo. Then, the comparison signal Vfb is linearly raised with the second inclination from t1 to t2. The voltage level of the output signal Sp from t1 to t2 is maintained at the second level (L level). The output from the controller 5 in this period is a control signal that turns off the switching element in the main circuit 4, the control signal being output as the control signal Sc from the controller 5 according to the output signal Sp from the comparator 6. A subsequent operation from t2 to t3 is the same as the operation from t0 to t1 described above and a subsequent operation from t3 to t4 is the same as the operation from t0 to t1. That is, the operations from t0 to t2 are repeatedly performed in subsequent timing periods.

As described above, the comparison signal Vfb, which is created according to the voltage level of the output signal Sp from the comparator 6 and to the level of the reference voltage Vs and is input to the second input terminal of the comparator 6, is lowered with the first inclination during a period from t0 to t1 or from t2 to t3, and when reaching the output voltage Vo at t1, the comparison signal Vfb is lowered to a voltage level lower than the output voltage Vo. After that, the comparison signal Vfb is raised with the second inclination during a period from t1 to t2 or from t3 to t4, and when reaching the output voltage Vo, the comparison signal Vfb is raised again to a voltage level higher than the output voltage Vo. The operations from t0 to t2 are repeatedly executed.

Figure 5:
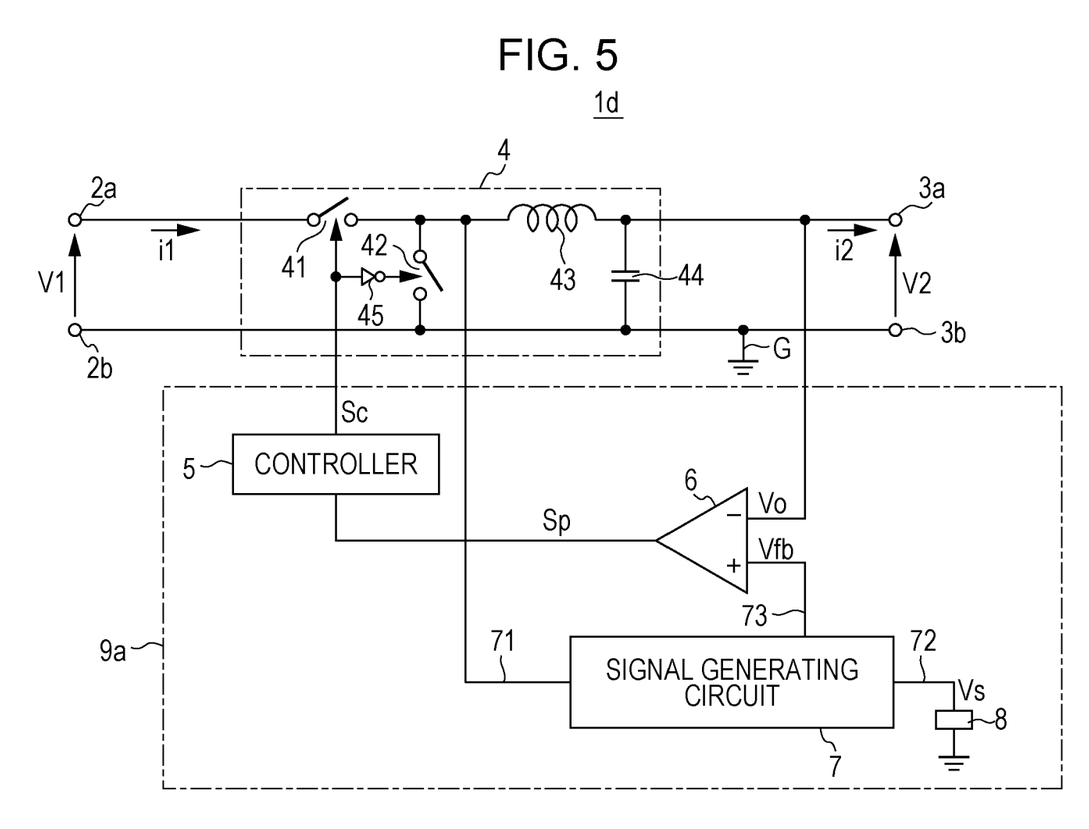
FIG. 5 schematically illustrates the circuit structure of a switching power supply unit according to a fourth embodiment of the present invention.

Although the comparison signal Vfb input to the second input terminal of the comparator 6 is the output signal from the output terminal 73 of the signal generating circuit 7, a signal in phase with the output signal Sp from the comparator 6 may be used. For example, a signal from a node between a switching element 42 and a choke coil 43 may be input to the first input terminal 71 of the signal generating circuit 7 instead of the output signal Sp from the comparator 6, as illustrated in FIG. 5. Since the signal from the node between the switching element 42 and the choke coil 43 is in phase with the output signal from the comparator 6, the signal from the node can be used as alternative to the output signal Sp.

Specifically, the control circuit has the controller 5 connected to a switching element 41 and the switching element 42, the signal generating circuit 7, which has the first input terminal 71 to which a signal is input according to an output signal from the output terminal of the comparator 6 and also has the second input terminal 72 to which a reference signal is input from the reference voltage source 8, and the comparator 6, which has the first input terminal to which the output voltage Vo is input from the switching power supply unit 1d, the second input terminal to which the comparison signal Vfb is input from the signal generating circuit 7, and the output terminal connected to the input part of the controller 5; the comparison signal Vfb is created according to a signal based on an output signal from the output terminal of the comparator 6 and to the reference voltage Vs of the reference voltage source 8; the comparison signal Vfb is raised when the signal based on the output signal from the output terminal of the comparator 6 is switched from the second level to the first level; the comparison signal Vfb is lowered with the first inclination during a period in which the signal based on the output signal from the output terminal of the comparator 6 is at the first level; the comparison signal Vfb is lowered when the signal based on the output signal from the output terminal of the comparator 6 is switched from the first level to the second level; the comparison signal Vfb is raised with the second inclination during a period in which the signal based on the output signal from the output terminal of the comparator 6 is at the second level. In the above structure as well in which a signal from the node between the switching element 42 and the choke coil 43 is used as an alternative, the effect that responsiveness to the input voltage is superior is obtained.

Figure 6:
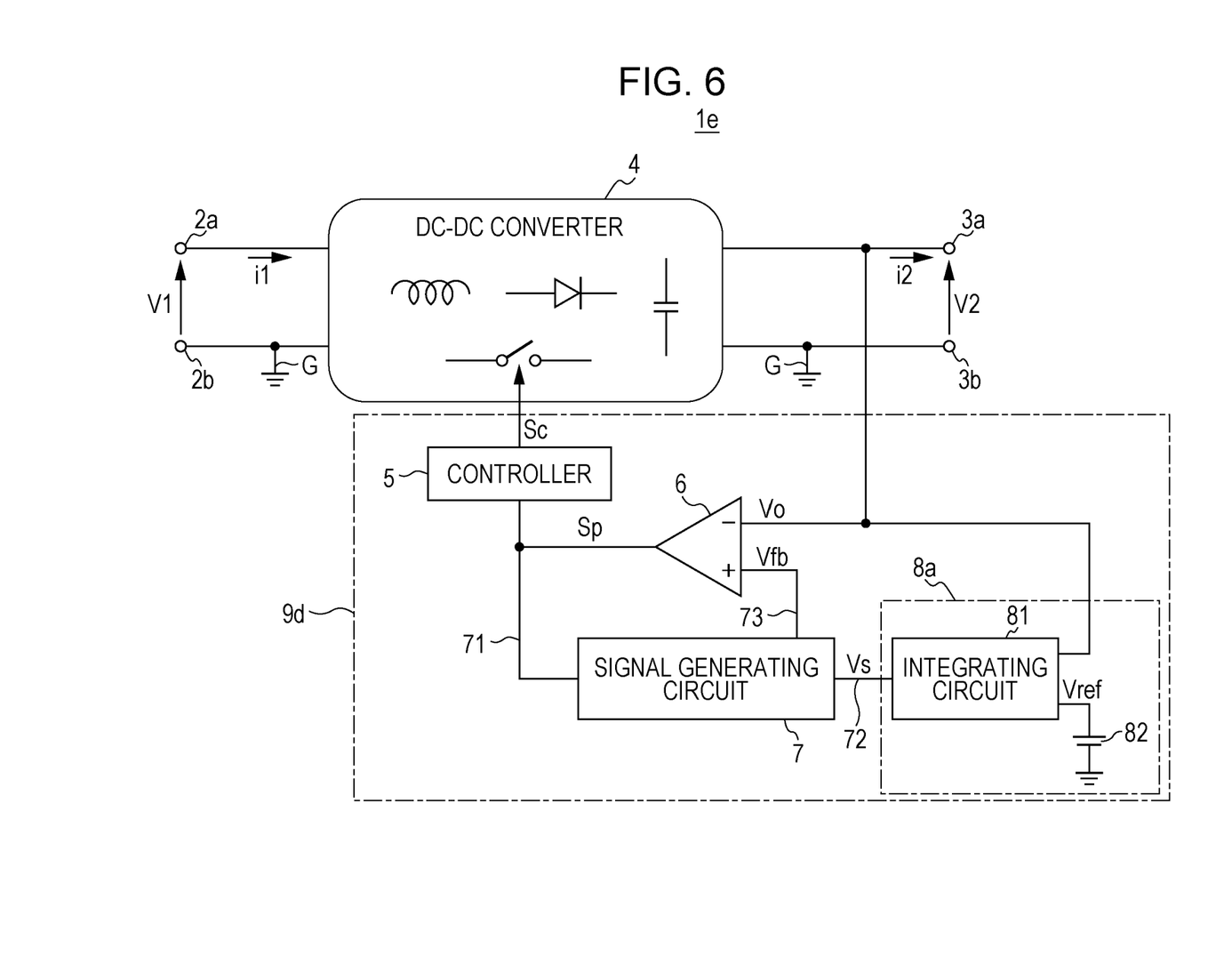
FIG. 6 schematically illustrates the circuit structure of a switching power supply unit according to a fifth embodiment of the present invention.

FIG. 6 schematically illustrates a circuit structure in which the reference voltage source 8 in FIG. 1 is replaced with a reference voltage source 8a in another embodiment. In other respects, the structure is the same as in FIG. 1. The reference voltage source 8a in FIG. 6 includes an integrating circuit 81 and a comparison voltage source 82. The output voltage Vo is input to the first input terminal of the integrating circuit 81, and a comparison voltage is input from the comparison voltage source 82 to the second input terminal of the integrating circuit 81. A difference between the output voltage Vo and the comparison voltage is integrated in the integrating circuit 81 and the resulting reference voltage is input to the second input terminal 72 of the signal generating circuit 7.

Thus, the reference voltage input to the signal generating circuit 7 can be made to be at the voltage level obtained by integrating a difference between the output voltage Vo and the comparison voltage of the comparison voltage source 82, so a steady-state deviation between the output voltage Vo and the comparison voltage can be improved.

The integrating circuit 81 can also be structured by using an operational amplifier, a capacitor, and a resistor. Alternatively, the integrating circuit 81 may be structured by using digital elements.

Figure 7:
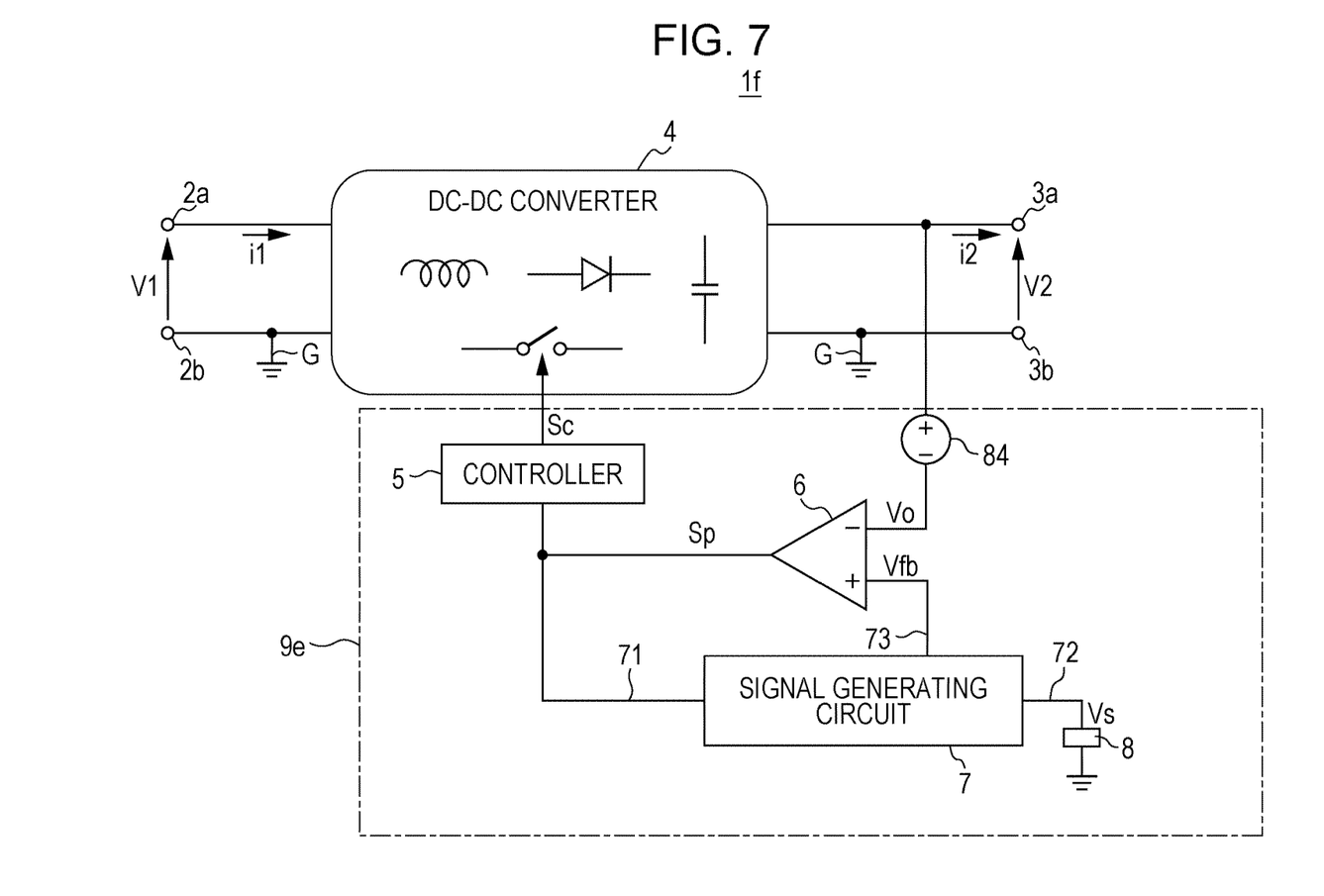
FIG. 7 schematically illustrates the circuit structure of a switching power supply unit according to a sixth embodiment of the present invention.

FIG. 7 schematically illustrates a circuit structure in which a constant-voltage source 84 is added to the structure in FIG. 1; in other respects, the structure is the same as in FIG. 1. The output terminal 3a of a switching power supply unit if is connected to the positive terminal of the constant-voltage source 84. The negative terminal of the constant-voltage source 84 is connected to the first input terminal of the comparator 6. Thus, when the output voltage V2 from the switching power supply unit if is input to the first input terminal of the comparator 6 through the constant-voltage source 84, if the output voltage V2 is high, the gain of the control loop can be increased. Therefore, response characteristics in a rapid load change can be improved.

As described above, the switching power supply units 1 according to the above embodiments have the comparison signal Vfb input to the second input terminal of the comparator 6, the comparison signal Vfb being created by inputting the output signal Sp from the comparator 6 and the comparison voltage Vs of the reference voltage source 8 to the signal generating circuit 7, which including the proportional element 7a, integrating element 7b, subtracter 7c. Therefore, the switching power supply units 1 can maintain superior responsiveness, can be highly resistant to switching noise, and can assure a sufficient phase margin without depending on the output voltage ripple of the converter.

Figure 8A:
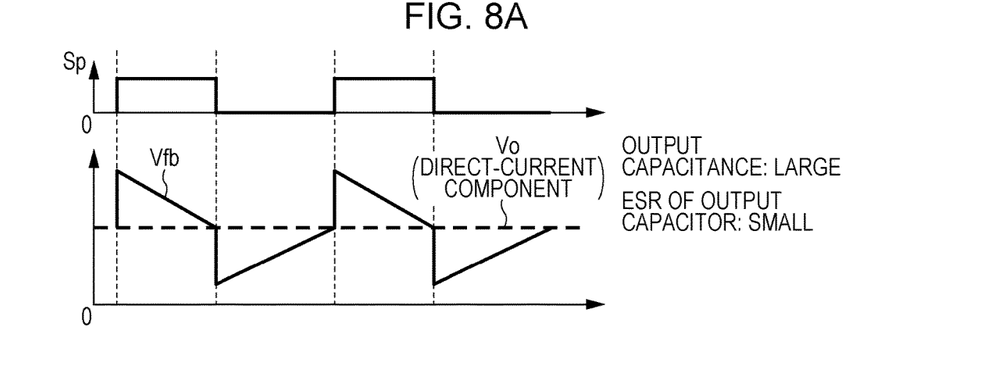
FIGS. 8A to 8C illustrate waveform charts used to explain output voltage ripples of the switching power supply units according to the present invention.
Figure 8B:
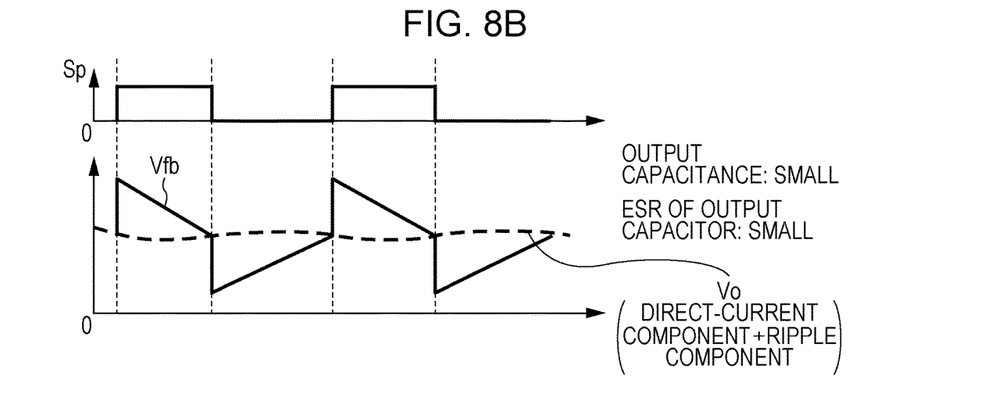
Figure 8C:
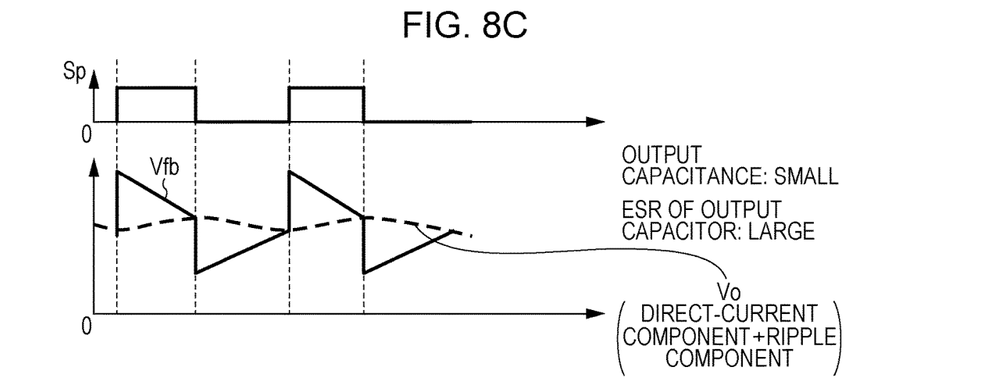

FIGS. 8A to 8C are waveform charts used to explain output voltage ripples of the switching power supply units 1 according to the present invention. It has been described that, as illustrated in FIGS. 4 and 8A, the output voltage Vo input to the first input terminal of the comparator 6 is a substantially direct-current output voltage; the alternating-current ripple component of the output voltage Vo is sufficiently small enough to be negligible. However, there is a case in which the output voltage Vo is not a direct-current voltage due to, for example, an effect of an output capacitor 44 included in the main circuit 4 or an effect of the equivalent series resistance (ESR) of the output capacitor 44. For example, FIG. 8B illustrates a waveform in a case in which the ripple component of a pulsating current is superimposed on the output voltage Vo, and FIG. 8C illustrates a waveform in a case in which the ripple component of a triangular wave form is superimposed on the output voltage Vo. Even if a ripple component is superimposed on the output voltage Vo as in these drawings, the same operations as when the output voltage Vo is a direct-current voltage are possible.

So far, the control circuits and switching power supply units in embodiments of the present invention have been described. However, the present invention is not limited to the embodiments described above; various modifications are possible.

For example, the constant-voltage source 84 can take the structure of any one of various constant-voltage sources. For example, the constant-voltage source 84 may be structured by including a zener diode or a three-terminal variable shunt regulator, a resistor, and a capacitor. Alternatively, the constant-voltage source 84 can be structured by using an insulted transformer or by using a capacitor and a linear regulator. Alternatively, the constant-voltage source 84 can be structured by using a capacitor and a switching regulator or by using a capacitor and charge pump circuit.

What is claimed is:

1. A control circuit that controls a switching element in a switching power supply unit, the control circuit comprising:
   a controller connected to the switching element;
   a signal generating circuit connected to an input part provided for the controller;
   a reference voltage source connected to the signal generating circuit; and
   a comparator having a first input terminal to which an output voltage is input from the switching power supply unit, a second input terminal to which a comparison signal is input from the signal generating circuit, and an output terminal connected to the signal generating circuit and to the input part provided for the controller; wherein
   the comparison signal is created according to an output signal from the comparator and to a reference voltage of the reference voltage source,
   the comparison signal is raised when the output signal from the comparator is switched from a second level to a first level,
   the comparison signal is lowered with a first inclination during a period in which the output signal from the comparator is at the first level,
   the comparison signal is further lowered when the output signal from the comparator is switched from the first level to the second level, and
   the comparison signal is raised with a second inclination during a period in which the output signal from the comparator is at the second level.

2. The control circuit according to claim 1, wherein a time average value of the comparison signal is equal to the reference voltage.

3. The control circuit according to claim 1, wherein the reference voltage source includes an integrating circuit that integrates a difference between a comparison voltage and the output voltage from the switching power supply unit.

4. The control circuit according to claim 1, wherein the output voltage from the switching power supply unit is input to the first input terminal of the comparator through a constant-voltage source.

5. The control circuit according to claim 1, wherein the signal generating circuit includes a proportional element, an integrating element, a subtracter, a first capacitive element, and a first resistor.

6. The control circuit according to claim 5, wherein:
   an input part provided for the proportional element is connected to the output terminal of the comparator;
   an input part provided for the integrating element is connected to the output terminal of the comparator;
   an output part provided for the proportional element is connected to a first input part provided for the subtracter;
   an output part provided for the integrating element is connected to a second input part provided for the subtracter;
   an output part provided for the subtracter is connected to one end of the first capacitive element;
   another end of the first capacitive element is connected to one end of the first resistor and to the second input terminal of the comparator;
   another end of the first resistor is connected to one end of the reference voltage source; and
   another end of the reference voltage source is connected to common ground.

7. The control circuit according to claim 6, wherein:
   the proportional element has a second resistor and a third resistor;
   the second resistor is disposed between an output part provided for the comparator and the first input part provided for the subtracter; and
   the third resistor is disposed between the common ground and the first input part provided for the subtracter.

8. The control circuit according to claim 6, wherein:
   the integrating element has a fourth resistor and a second capacitive element;
   the fourth resistor is disposed between the output part provided for the comparator and the second input part provided for the subtracter; and
   the second capacitive element is disposed between the common ground and the second input part provided for the subtracter.

9. The control circuit according to claim 5, wherein the subtracter includes an operational amplifier, a capacitor, and a fifth resistor.

10. The control circuit according to claim 1, wherein:
    the controller switches the switching element a plurality of times during a period in which the output signal from the comparator is at the first level; and
    the controller stops switching of the switching element during a period in which the output signal from the comparator is at the second level.

11. The control circuit according to claim 1, wherein the switching power supply unit is a resonant converter.

12. A control circuit that controls a switching element in a switching power supply unit, the control circuit comprising:
    a controller connected to the switching element;
    a signal generating circuit; and
    a comparator having a first input terminal to which an output voltage is input from the switching power supply unit, a second input terminal to which a comparison signal is input from the signal generating circuit, and an output terminal connected to an input part provided for the controller; wherein the signal generating circuit has a first input terminal to which a signal is input according to an output signal output from the output terminal of the comparator and also has a second input terminal to which a reference voltage is input from a reference voltage source, the comparison signal is created according to a signal based on the output signal output from the output terminal of the comparator and to the reference voltage of the reference voltage source, the comparison signal is raised when the signal based on the output signal output from the output terminal of the comparator is switched from a second level to a first level, the comparison signal is lowered with a first inclination during a period in which the signal based on the output signal output from the output terminal of the comparator is at the first level, the comparison signal is further lowered when the signal based on the output signal output from the output terminal of the comparator is switched from the first level to the second level, and the comparison signal is raised with a second inclination during a period in which the signal based on the output signal output from the output terminal of the comparator is at the second level.

13. A switching power supply unit that has the control circuit according to claim 1.

14. The control circuit according to claim 2, wherein the reference voltage source includes an integrating circuit that integrates a difference between a comparison voltage and the output voltage from the switching power supply unit.

15. The control circuit according to claim 2, wherein the output voltage from the switching power supply unit is input to the first input terminal of the comparator through a constant-voltage source.

16. The control circuit according to claim 3, wherein the output voltage from the switching power supply unit is input to the first input terminal of the comparator through a constant-voltage source.

17. The control circuit according to claim 2, wherein:

the controller switches the switching element a plurality of times during a period in which the output signal from the comparator is at the first level; and the controller stops switching of the switching element during a period in which the output signal from the comparator is at the second level.

18. The control circuit according to claim 3, wherein:

the controller switches the switching element a plurality of times during a period in which the output signal from the comparator is at the first level; and the controller stops switching of the switching element during a period in which the output signal from the comparator is at the second level.

19. The control circuit according to claim 4, wherein:

the controller switches the switching element a plurality of times during a period in which the output signal from the comparator is at the first level; and the controller stops switching of the switching element during a period in which the output signal from the comparator is at the second level.

20. A switching power supply unit that has the control circuit according to claim 12.

* * * * *

UNITED STATES PATENT AND TRADEMARK OFFICE
CERTIFICATE OF CORRECTION

PATENT NO. : 9,564,803 B1  
APPLICATION NO. : 15/061410  
DATED : February 7, 2017  
INVENTOR(S) : Lin et al.

Page 1 of 1

It is certified that error appears in the above-identified patent and that said Letters Patent is hereby corrected as shown below:

On the Title Page

Item (72) Inventors, should read:  
--(72) Inventors: Min Lin, Tokyo (JP); Ken Matsuura, Tokyo (JP)--.

Signed and Sealed this  
Sixteenth Day of May, 2017

Michelle K. Lee  
*Director of the United States Patent and Trademark Office*